(12) United States Patent
Higby

(10) Patent No.: US 8,481,851 B2
(45) Date of Patent: Jul. 9, 2013

(54) VARIABLE LENGTH LIGHTNING STRIKE DOWN-CONDUCTOR

(75) Inventor: John P. Higby, Beverly, MA (US)

(73) Assignee: Raytheon Company, Waltham, MA (US)

( * ) Notice: Subject to any disclaimer, the term of this patent is extended or adjusted under 35 U.S.C. 154(b) by 315 days.

(21) Appl. No.: 13/033,963

(22) Filed: Feb. 24, 2011

(65) Prior Publication Data
US 2012/0217058 A1  Aug. 30, 2012

(51) Int. Cl.
*H02G 13/00* (2006.01)
*H02G 3/00* (2006.01)

(52) U.S. Cl.
USPC ............ 174/2; 174/6; 174/78; 174/70 R; 29/825; 361/799

(58) Field of Classification Search
USPC .......... 174/2, 3, 5 R, 6, 7, 72 R, 72 A, 40 CC, 174/51, 78; 361/600, 601, 753, 219, 799; 29/825, 592, 592.1; 439/92, 95, 100, 101; 242/370, 378.2, 385; 191/12.2 R, 12.4
See application file for complete search history.

(56) References Cited

U.S. PATENT DOCUMENTS

| | | | |
|---|---|---|---|
| 4,021,090 A * | 5/1977 | Fredericksen | 174/5 SG |
| 4,882,647 A | 11/1989 | Collins | |
| 4,890,189 A | 12/1989 | Geneviéve | |
| 5,065,163 A | 11/1991 | Mears | |
| 5,453,585 A * | 9/1995 | Lenz et al. | 191/12.2 R |
| 6,011,218 A | 1/2000 | Burek et al. | |
| 6,372,988 B1 * | 4/2002 | Burke et al. | 174/72 R |
| 6,460,795 B1 * | 10/2002 | Brown, Jr. | 191/12.2 R |
| 6,703,556 B2 | 3/2004 | Darveniza | |
| 7,078,621 B1 | 7/2006 | Carpenter, Jr. et al. | |
| 7,385,147 B2 | 6/2008 | Garmong | |
| 2002/0162671 A1 | 11/2002 | Darveniza | |

FOREIGN PATENT DOCUMENTS
EP  2 073 305 A1  6/2009

OTHER PUBLICATIONS

U.S. Appl. No. 13/033,958, filed Feb. 24, 2011, Specification and Figures, 35 pages.
Cavotec Product Catalogue; "CLT—Spring Driven Cable Reels;" Jul. 2006; pp. 1-16.
Cavotec Product Catalogue; "FLT—Spring Driven Cable Reels;" Nov. 2006; pp. 1-28.
Gleason Reels Catalog; "Heavy Duty Lift, Stretch and Retrieve Reels;" Series S and Series WB; CR-8; pp. 1-32, 2001.
Notification of Transmittal of the International Search Report and the Written Opinion of the International Searching Authority, or the Declaration; PCT/US2012/020394, date of mailing Apr. 24, 2013, 4 pages.
Written Opinion of the International Searching Authority; PCT/US2012/020394, date of mailing Apr. 24, 2013, 9 pages.

* cited by examiner

*Primary Examiner* — Angel R Estrada
(74) *Attorney, Agent, or Firm* — Daly, Crowley, Mofford & Durkee, LLP

(57) ABSTRACT

A variable-length lightning strike down-conductor is provided that allows for optimized ground path length, where excess down-conductor (grounding) cable is tightly coiled (e.g., as a mono-spiral coil) on a cable reel. Specifically, a primary down-conductor cable from an adjustable-length air terminal is clamped between the air terminal and the cable reel at any intermediate length, and the clamp is shunted to the ground plane (e.g., earth ground) through a second low-impedance down-conductor cable, as opposed to the high-impedance coiled down-conductor cable, thus increasing down-conductor effectiveness by reducing the impedance seen by a lightning strike to reach the ground plane.

21 Claims, 11 Drawing Sheets

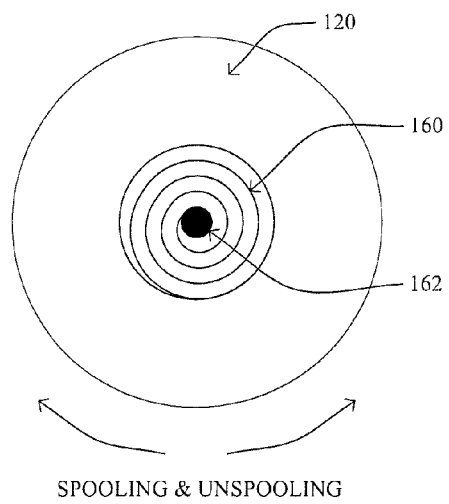
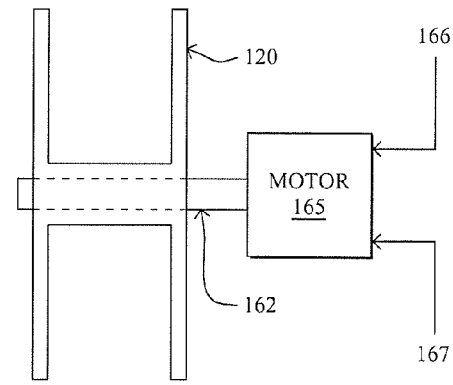
FIG. 4A
FIG. 4B

VARIABLE LENGTH LIGHTNING STRIKE DOWN-CONDUCTOR

FEDERALLY SPONSORED RESEARCH

This invention was made with Government support by the Department of Defense under UAE Patriot Contract No. W31P4Q-09-G-0001. The Government may have certain rights in the invention.

TECHNICAL FIELD

The present disclosure relates generally to lightning strike down-conductors (e.g., lightning rods), and, more particularly, to variable-length lightning strike down-conductors.

BACKGROUND

Lightning rods, or, more particularly, "air terminals" or "finials," are conductors that may be mounted on top of a building, tower, antenna, or other structure, and electrically connected to the ground through a wire, called a "down-conductor," to intercept the charge that terminates on a structure and carry it to the ground. If lightning strikes the structure, it will preferentially strike the air terminal, and be conducted relatively harmlessly to ground through the down-conductor, instead of passing through the structure, where it could cause various forms of damage, such as fire or electrical damage to sensitive components.

Air terminals are generally designed to convey the current from a strike to the ground (or water) via a low-resistance down-conductor that is inserted into the ground, ideally in an area of high ground conductivity. While the electrical resistance of the lightning conductor between the air terminal and the earth is important, the inductance of the conductor is an important consideration as well. For this reason, it is known that it is best to keep the down-conductor route short and to ensure that any curves or bends in the down-conductor have a large radius. If these measures are not taken, lightning current is more likely to arc over an obstruction, resistive or reactive, that it encounters in the down-conductor. At the very least, the arcing may damage the lightning conductor and the current is divided among alternate conductive paths to ground, such as through the structure (building wiring/plumbing, metal structural components, etc.) and can cause unwanted damage.

Often, structures that require lightning strike protection are adjustable in height, such as telescoping towers, masts, antennas, etc. Because the structure/payload is at an indeterminate height above the earth, proper bonding for lightning strike mitigation is inherently difficult, leading to excessive lengths of grounding cables which result in performance degradation. As noted above, it is best to avoid kinks or coils in a down-conductor for lightning strikes to reduce the impedance seen by the lightning to reach the ground.

Various conventional solutions to this problem have been utilized to account for the variable-length of the structure and associated air terminal. For instance, in one technique, the excess grounding cable is coiled at the base of the structure next to a grounding rod inserted into the earth. However, the coils and sharp bends in the lightning strike down-conductor (grounding) cable are undesirable as they increase the impedance seen by the high frequency event. Alternatively, in another technique, grounding cables can also be deployed away from the structure to a ground rod in an effort to "use up" excess cable length (avoiding loops and sharp turns). As the adjustable-height structure is lowered, however, an intermediate attachment point or separate ground rod needs to be driven to accommodate this change in the amount of excess cable length. In this technique in particular, the down-conductor is manually deployed, thus potentially endangering an operator due to height adjustments in response to lightning activity, in addition to the general inconvenience of the operation itself.

SUMMARY

According to one or more embodiments of the invention as described herein, a variable-length lightning strike down-conductor is provided that allows for optimized ground path length, where excess down-conductor (grounding) cable is tightly coiled (e.g., as a mono-spiral coil) on a cable reel. Specifically, a primary down-conductor cable from an adjustable-length air terminal is clamped between the air terminal and the cable reel at any intermediate length, and the clamp is shunted to the ground plane (e.g., earth ground) through a second low-impedance down-conductor cable, thus redirecting most of a received current from the high-impedance path of the coiled down-conductor cable. As such, the techniques herein alleviate excess twists, loops, or tight bends from the down-conductor's path that would generally otherwise reduce down-conductor effectiveness (e.g., due to the impedance seen by the lightning strike to reach the ground plane). In addition, the techniques herein require minimal operator participation, e.g., such that the operator is not required to disconnect and re-make ground connections to raise or lower a tower, and allow for rapid emplacement and tear-down (e.g., road-march) of equipment in general.

According to one or more embodiments of the disclosure, an apparatus may comprise a first down-conductor cable adapted to conductively attach to an adjustable-length air terminal approximate to a first end of the first down-conductor cable. The apparatus also comprises a cable reel attached to the first down-conductor cable approximate to a second end of the first down-conductor cable, the cable reel configured to spool and unspool the first down-conductor cable in response to movement of the adjustable-length air terminal. A conductive clamp is positioned along the first down-conductor cable between the first end of the first down-conductor and the cable reel, the clamp configured to allow movement of the first down-conductor cable during spooling and unspooling, and also configured to establish a high-current-capable electrical contact with the first down-conductor cable. A second down-conductor cable is conductively attached to the clamp approximate to a first end of the second down-conductor cable, the second down-conductor cable adapted to conductively attach to an electrical ground plane approximate to a second end of the second down conductor, wherein a high-current-capable grounding path from the first end of the first down-conductor cable passes through the clamp to the second end of the second down-conductor cable as a low-impedance path when the second end of the second down-conductor cable is attached to the electrical ground plane.

In one embodiment, the cable reel comprises a mono-spiral configuration. In one embodiment, a spring is attached to the cable reel, the spring configured to spring-load the cable reel during spooling and unspooling.

In one embodiment, at least one of the first down-conductor cable and second down-conductor cable comprises one of either a braided or a twisted multi-strand cable.

In one embodiment, at least one of the first down-conductor cable and second down-conductor cable comprises a flattened tubular cable.

In one embodiment, a motor is attached to the cable reel, the motor configured to spool the cable reel in response to an input to the air terminal to shorten its length and to unspool the cable reel in response to an input to the air terminal to extend its length.

In one embodiment, the clamp is configured to open to allow movement of the first down-conductor cable during spooling and unspooling, the clamp further configured to close to establish the high-current-capable electrical contact with the first down-conductor cable.

In one embodiment, the first down-conductor cable has a generally curved exterior, and an interior of the clamp is curved to substantially conform to the curved exterior of the first down-conductor cable.

In one embodiment, the clamp comprises a conductive roller assembly.

In one embodiment, a high-impedance grounding path from the first end of the first down-conductor cable passes through the second end of the first down-conductor, and wherein a majority of any current received at the first end of the first down-conductor cable passes through the low-impedance path to the second end of the second down-conductor cable attached to the electrical ground plane.

In one embodiment, the first down-conductor cable comprises a plurality of ferrules spaced along the first down-conductor cable.

According to one or more embodiments of the disclosure, a method comprises: conductively attaching a first down-conductor cable to an adjustable-length air terminal approximate to a first end of the first down-conductor cable; attaching a cable reel to the first down-conductor cable approximate to a second end of the first down-conductor cable, the cable reel configured to spool and unspool the first down-conductor cable in response to movement of the adjustable-length air terminal; feeding the first down-conductor cable through a conductive clamp between the first end of the first down-conductor and the cable reel, the clamp configured to allow movement of the first down-conductor cable during spooling and unspooling, and also configured to establish a high-current-capable electrical contact with the first down-conductor cable; conductively attaching a second down-conductor cable to the clamp approximate to a first end of the second down-conductor cable; and providing means for conductively attaching the second down-conductor cable to an electrical ground plane approximate to a second end of the second down conductor, wherein a high-current-capable grounding path from the first end of the first down-conductor cable passes through the clamp to the second end of the second down-conductor cable as a low-impedance path when the second end of the second down-conductor cable is attached to the electrical ground plane.

In one embodiment, the method further comprises spooling the first down-conductor around the cable reel in a monospiral configuration.

In one embodiment, the method further comprises spring-loading the cable reel.

In one embodiment, the method further comprises conductively attaching the first end of the second down-conductor cable to a vehicular chassis ground.

In one embodiment, the method further comprises opening the clamp to allow movement of the first down-conductor cable during spooling and unspooling; and closing the clamp to establish the high-current-capable electrical contact with the first down-conductor cable.

In one embodiment, the method further comprises configuring the clamp to open and close without user intervention based on the air terminal adjusting its length.

According to one or more embodiments of the disclosure, an method comprises: conductively attaching a second down-conductor cable to an electrical ground plane approximate to a second end of the second down conductor, the second down-conductor cable conductively attached to a conductive clamp approximate to a first end of the second down-conductor cable; opening the conductive clamp, the conductive clamp located along a first down-conductor cable between a first end of the first down-conductor at an adjustable-length air terminal and a second end of the first down-conductor at a cable reel, the opening to allow movement of the first down-conductor cable during spooling and unspooling of the first down-conductor cable around the cable reel; adjusting the length of the adjustable-length air terminal while the clamp is open, wherein the cable reel is configured to spool and unspool the first down-conductor cable in response to the adjusted length; and closing the conductive clamp while the length of the adjustable-length air terminal is stationary, the closing to establish a high-current-capable electrical contact between the conductive clamp and the first down-conductor cable, wherein a high-current-capable grounding path from the first end of the first down-conductor cable passes through the clamp to the second end of the second down-conductor cable as a low-impedance path when the second end of the second down-conductor cable is attached to the electrical ground plane.

In one embodiment, the electrical ground plane comprises earth ground.

In one embodiment, opening is in response to a first user input to adjust the length of the air terminal, and closing is in response to a second user input to cease adjustment of the air terminal length.

In one embodiment, where the air terminal is located as a first geographic location, the method further comprises: reducing the length of the air terminal; spooling the first down-conductor around the cable reel; and relocating the air terminal to a second geographic location.

BRIEF DESCRIPTION OF THE DRAWINGS

The embodiments of the invention herein may be better understood by referring to the following description in conjunction with the accompanying drawings in which like reference numerals indicate identically or functionally similar elements, of which:

FIGS. 4A-B illustrate examples of assisted spooling and unspooling;

DESCRIPTION OF EXAMPLE EMBODIMENTS

A variable-length lightning strike down-conductor in accordance with one or more embodiments described in detail below may be utilized in a variety of different situations. For example, any equipment that requires electrical grounding or lightning strike survivability may utilize the system herein. For instance, while a standalone adjustable-length air terminal may be used, the system and techniques herein may be particularly useful with any equipment having a correspondingly adjustable-length (e.g., height) mast, tower, etc., such as by affixing the air terminal to the adjustable-length mast (e.g., a telescoping antenna), or by locating a separate, standalone adjustable-length air terminal near the site of the adjustable-length structure to be protected. Also, the system may be stationary at a single geographic location, or may be used with mobile systems, such as those that require adjustable-lengths to assist in mobility.

Figure 1:
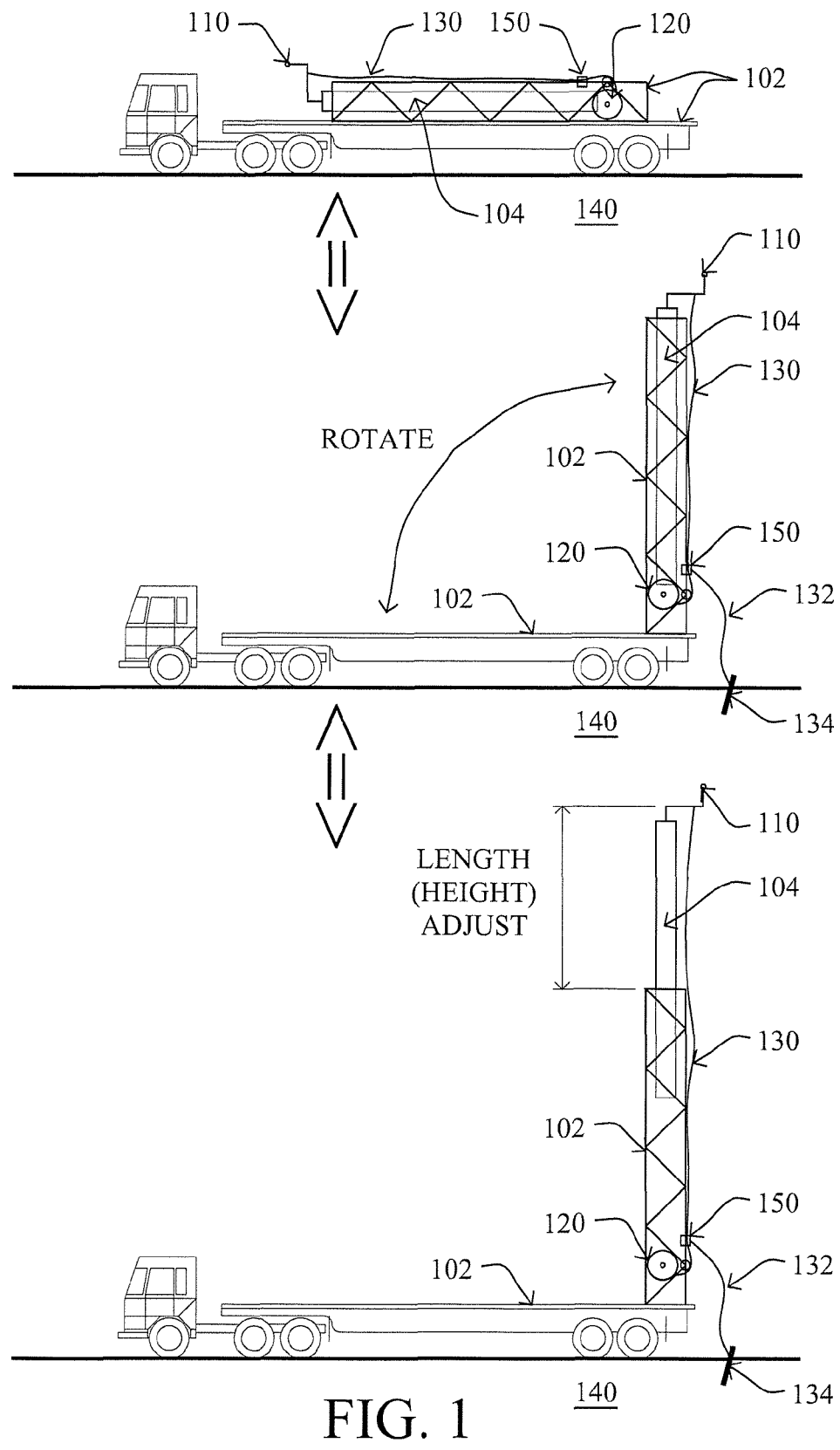
FIG. 1 illustrates an example mobile antenna deployment.

FIG. 1 illustrates an example of a mobile payload that may be used in accordance with one or more embodiments herein. In particular, as one example implementation, a structure 102 comprises a truck (or other land vehicle) and/or support structure that may be configured to carry an adjustable-length (e.g., height) payload 104, such as an antenna mast (with antenna 111 located at/near the top of the mast/payload 104), a mobile telecommunications tower, etc., such as for mobile deployment (e.g., rapid response, disaster relief equipment, etc.) of the payload 104 to a desired location. As shown, and as described in greater detail below, an air terminal 110, such as a mast, lightning rod, lightning conductor, sacrificial antenna (e.g., a whip antenna that is used as an air terminal that is not expected to operate after an initial lightning strike), finial, strike termination device, etc., may be placed atop the adjustable-length payload 104, such as one that supports antenna 111 or other device. A primary down-conductor cable 130 attached to the air terminal 110 may be spooled around a cable reel 120, illustratively at the base of the payload 104, as described in detail herein. Note that as used herein, a fixed-length air terminal 110 located at the end of an adjustable-length payload 104 is considered an adjustable-length air terminal, the adjustable length in relation to cable reel 120. In certain embodiments, the air terminal is the only device located atop payload 104, i.e., there is no other device such as antenna 111 that shares the adjustable length payload 104. Also note that in such instances where the air terminal shares the payload, e.g., with an antenna 111, there may be a physical separation between the air terminal 110 and the antenna 111 and payload 104 to prevent side-flashes/inadvertent conductance. For example, out-rigger bars may be used to separate the air terminal from the antenna/payload such that a rolling sphere analysis (as will be understood by those skilled in the art) contacts the air terminal first. The protected equipment (e.g., antenna 111) may then be placed at least a calculated distance away.

As shown in FIG. 1, the payload 104 may rotate at its base (if necessary), and may extend and retract according to operator commands, such as based on electrical and/or hydraulic control, etc., adjusting its length (e.g., height) in relation to its base. As also shown, a second down-conductor cable 132 may be attached to the first/primary down-conductor cable 130 between the cable reel 120 and air terminal 110. The second down-conductor cable 132 may be inserted into (conductively attached to) a ground plane (e.g., earth ground) 140 via a grounding rod 134.

According to one or more of the embodiments herein, a variable-length lightning strike down-conductor system may be used to solve the problem of grounding the adjustable-length payloads 104, such as masthead mounted equipment used in telescoping towers. In particular, as described below, a high-current-capable path is created from the air terminal 110 down to a clamp 150 prior to the cable reel 120 that diverts the path to the second down-conductor cable 132 to the ground plane 140, while any excess primary down-conductor cable is spooled around the cable reel, which is not a best path for any lightning strikes. Specifically, the system described herein provides an electrical chassis ground and lightning strike down-conductor protection for variable-length/height towers/masts, allowing for the tower to be extended to any height without re-termination of the ground cable (the second down-conductor cable 132). Accordingly, for mobile payloads, the system allows a reduced emplacement (set-up) and tear-down (e.g., "road-march") time.

Figure 2:
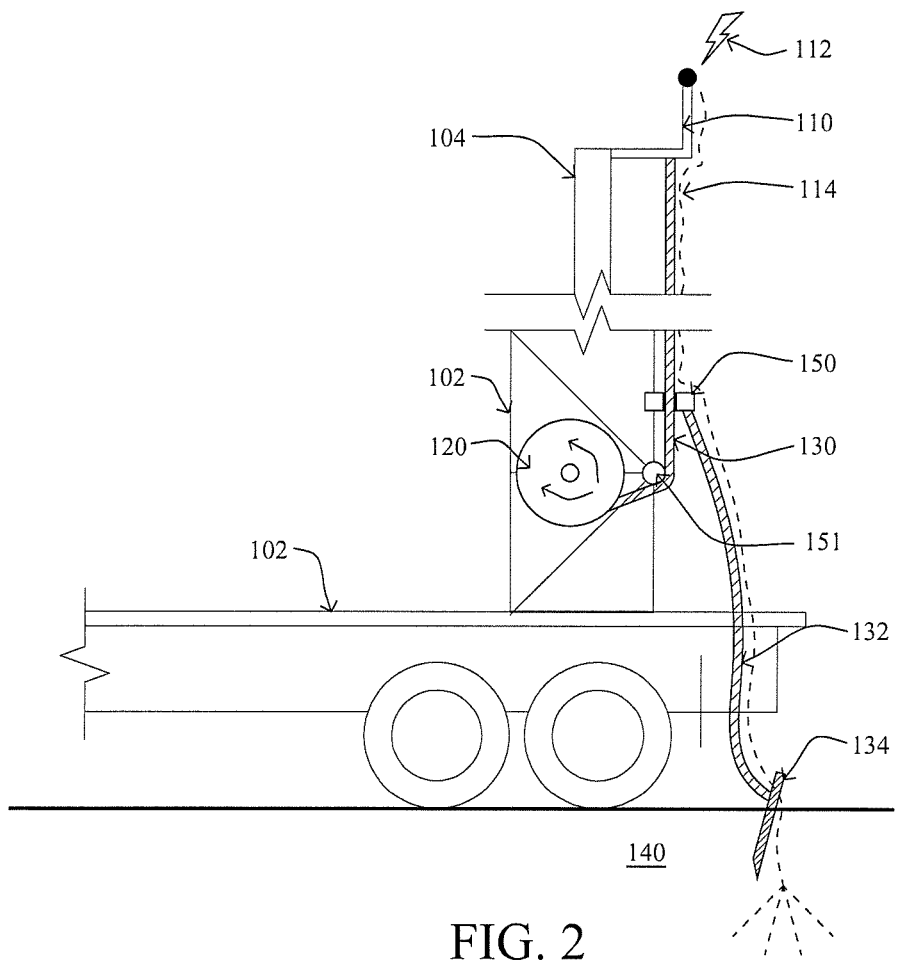
FIG. 2 illustrates an example variable-length lightning strike down-conductor system.

FIG. 2 illustrates an example variable-length lightning strike down-conductor system 200 in accordance with one or more embodiments described herein. In particular, an air terminal 110, generally constructed from a conductive material apt to intercept lightning strikes (or other high current events) 112, may be located on an adjustable-length device 104 (e.g., antenna, tower, mast, etc.), referred to in combination as an adjustable-length air terminal 110. Attached to the air terminal is a primary/first down-conductor cable 130 that is fed through a clamp 150 (and illustrative rollers 151) to a cable reel 120. In addition, as mentioned above, a second down-conductor 132 may be attached to the clamp 150, and adapted to conductively attach, e.g., via a grounding rod (or other device) 134 to electrical ground plane 140. In accordance with the embodiments herein, a high-current-capable grounding path 114 is created from the air terminal 110 to the ground plane 140 via the second down-conductor cable. Illustratively, this path 114 is better than (i.e., more resistive conductance, lower impedance, etc.) than any path through the portion of the primary/first down-conductor cable 130 below the clamp 150 and spooled around the cable reel 120.

Illustratively, the first and second down-conductors may be made of a suitably conductive material and configured for handling high-currents, such as copper, and, particularly, uninsulated copper braided cable. In certain embodiments, the down-conductors may comprise a flattened tubular cable, such as, e.g., a flattened tubular (hollow) braid. The use of a braided cable and its associated surface area (particular a flattened tubular braid), allows for greater "skin effect" of electron travel along the down-conductors in the event of a high-current event such as a lightning strike, though solid cables may also be utilized. Notably, the first and second (and third, below) down-conductors need not be configured as the same type of cable, e.g., one being braided while the other is solid, one being copper while the other is not, one being insulated while the other is not, etc.

The first down-conductor cable 130 is adapted to conductively attach to the adjustable-length air terminal 110 approximate to a first end of the first down-conductor cable. The attachment may be a permanent attachment (e.g., welding, soldering, etc.) or replaceable (e.g., brackets, bolts, screws, etc.), so long as the conductive relationship between the air terminal 110 and first down-conductor cable 130 is sufficient to handle the expected current (e.g., in excess of 70,000 Amps).

Figure 3A:
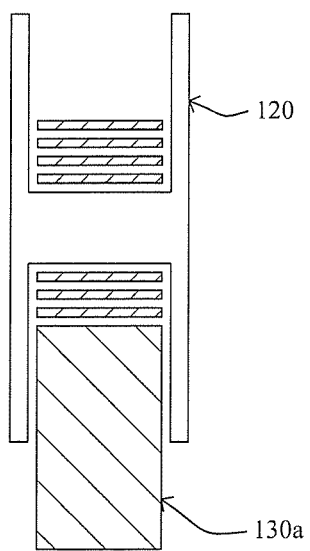
FIGS. 3A-B illustrate example cable spooling configurations.
Figure 3B:
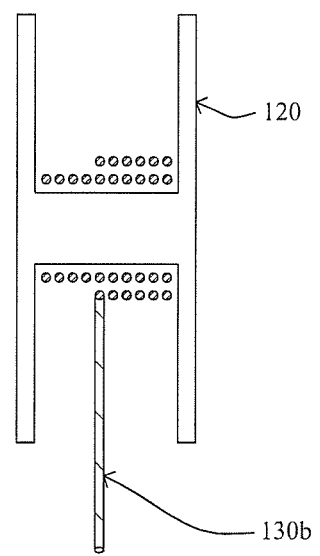

At the other end of the first down-conductor cable 130, a cable reel 120 may be affixed to an unmoving structure (with respect to the adjustable-length air terminal 110). The cable reel 120, attached to the first down-conductor cable 130 approximate to a second end of the first down-conductor cable, is configured to spool and unspool the first down-conductor cable in response to movement of the adjustable-length air terminal. In one embodiment, the first down-conductor may be wound onto a mono-spiral cable reel 120, in which the reel has side plates spaced approximately one cable-width apart, such that the cable coils (spools) on top of itself in a tight spiral.

is For instance, as shown in FIG. 3A, a cutaway of the cable reel 120 illustrates a flattened (e.g., tubular) first down-conductor 130*a* that is mono-spiraled around the reel 120. Alternatively, the first down-conductor cable may be spooled around the reel in a parallel lay configuration, where the side plates/walls of the reel are arranged such that each winding of the cable (other than end windings) essentially lies next to a previous winding. For example, FIG. 3B illustrates an example parallel lay of a first down-conductor cable 130*b*, notably a non-flattened copper wire (e.g., a solid copper wire, or multi-strand copper wire), around the cable reel 120.

Moreover, according to certain embodiments herein, the cable reel 120 may be configured to manage the excess length of first down-conductor cable 130, such as to reduce slack in the cable 130. For instance, as shown in the cross-section of FIG. 4A, the cable reel 120 may be spring-loaded, such that a spring 160 is attached to the cable reel 120 and wraps around an axle 162 (which itself is attached to the structure 102). In this manner, as will be understood by those skilled in the art, the cable reel 120 (self-retracting) provides adequate tension around the affixed axle to pull back on any cable slack in order to spool excess cable when the air terminal's length is shortened, and provides appropriate resistance to unspooling when the air terminal's length is extended.

FIG. 4B illustrates an alternative (or addition) to a spring-loaded cable reel, where a motor 165 may be used to assist the spooling and unspooling of the reel 120. For example, as shown, the motor 165 is directly attached to a rotatable axle 162 affixed to the cable reel 120. User/operator input 166 may be supplied to control the motor (e.g., spool or unspool), based on corresponding utilization of an associated power supply 167. Note that in one embodiment, the input/control 166 is based on direct user interaction, where an operator specifically commands the motor to turn the cable reel 120. In another embodiment, however, the motor may be configured to spool the cable reel in response to an input to the air terminal to shorten its length and to unspool the cable reel in response to an input to the air terminal to extend its length. In other words, if an operator adjusts the length (e.g., height) of the air terminal 110, then the cable reel 120 may automatically be spooled and/or unspooled by the motor 165 in response to the control of the air terminal. Notably, while the motor 165 is shown spinning the axle 162, other arrangements may be used, such as belt and pulley systems, gears, chains, etc., and the direct connection is merely an illustrative example.

Referring again to FIG. 2, the system 200 further comprises a conductive clamp 150 that is positioned along the first down-conductor cable 130 between the first end of the first down-conductor (at the air terminal 110) and the cable reel 120. Specifically, the first down-conductor cable 130 is fed through the conductive clamp 150, which is configured to allow movement of the first down-conductor cable 130 during spooling and unspooling, and also configured to establish a high-current-capable electrical contact when clamped on the first down-conductor cable. Roller 151 may be used to help feed the first down-conductor cable 130 through the clamp in the event there are any turns/bends in the cable, preferably in certain embodiments located below the clamp 150 (i.e., between the clamp and the cable reel).

Figure 5A:
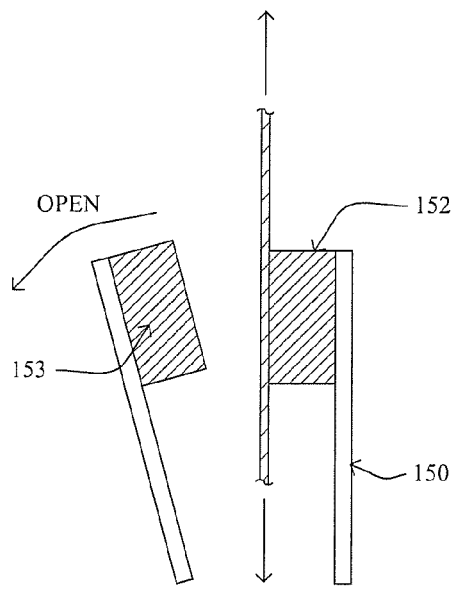
FIGS. 5A-C illustrate example conductive clamps.
Figure 5B:
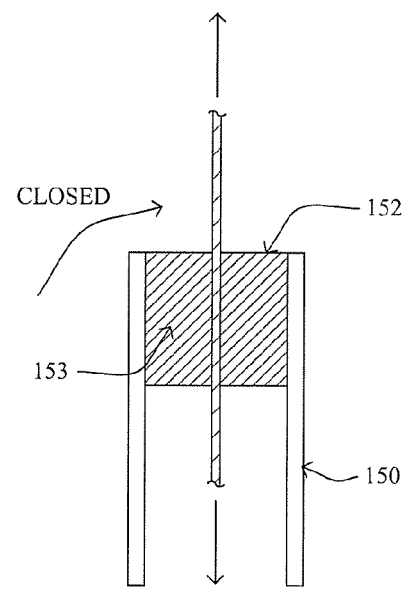

According to one or more embodiments herein, the conductive clamp may open to allow movement of the first down-conductor cable 130 during spooling and unspooling, and may close to establish the high-current-capable electrical contact with the first down-conductor cable. For example, as shown in FIGS. 5A-B, the clamp may include one or more conductive plates 152/153, where at least one of the plates 152/153 is configured to move (e.g., pivot, slide, etc.) in relation to the other. When open, as in FIG. 5A, the first/primary down-conductor cable 130 is allowed to move within the clamp 150, while when closed, as in FIG. 5B, the clamp (e.g., a jaw-like mechanism) pinches in on the cable 130, establishing a high-current-capable conductive attachment between the cable 130 and the clamp 150.

Figure 5C:
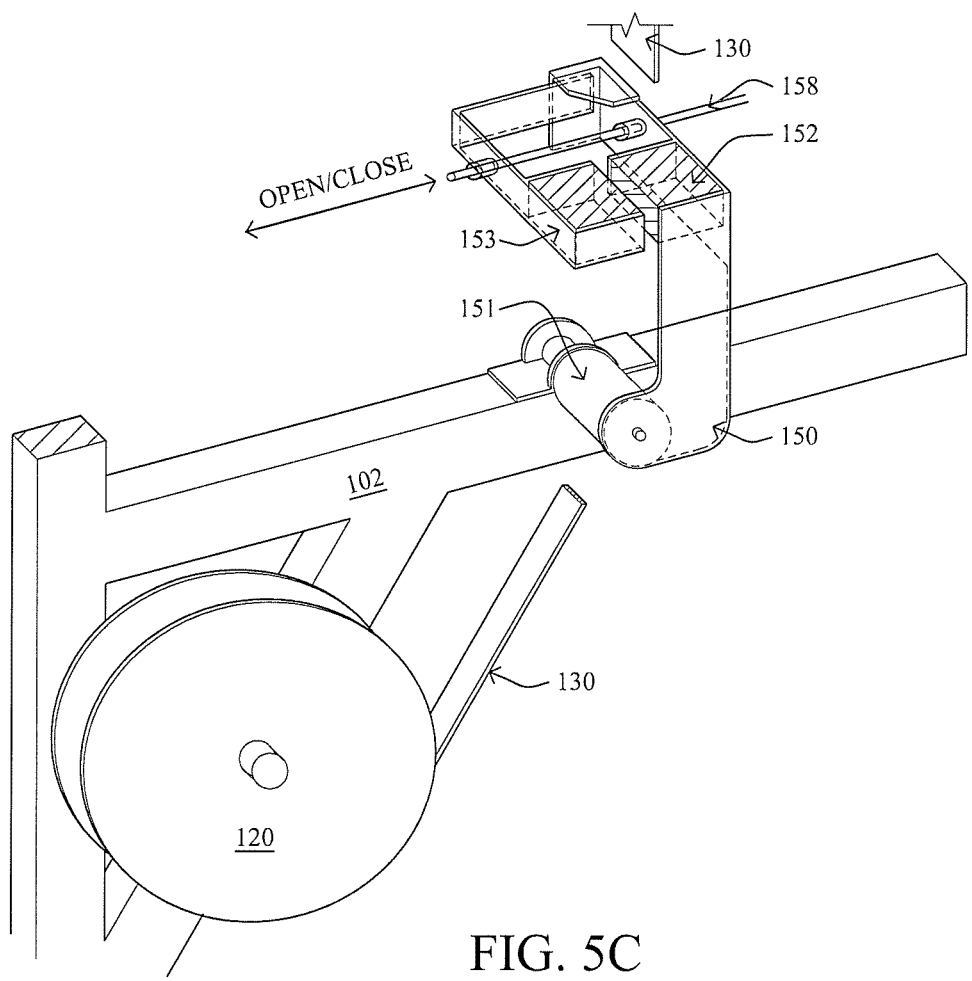

FIG. 5C illustrates a more detailed example implementation of the clamp 150 (and rollers 151), attached to the structure 102 as shown. The first down-conductor 130 may be spooled around the cable reel 120 and fed through the clamp 150 (not shown through the clamp in FIG. 5C for clarity of the clamp). Plate 152 is shown in a fixed relationship to the structure 102, while plate 153 is shown hingedly affixed to the clamp 150, and controlled by an illustrative cam-lock remotely operated lever system 158. For instance, an operator may used the lever system 158 (e.g., from a reachable location on the structure 102) to control the opening and closing of the clamp 150. When the length of the adjustable-length air terminal 110 (payload/mast 104) is to be adjusted, the operator may open the clamp accordingly to allow movement of the first down-conductor cable. When the length is set, and the first down-conductor cable is no longer moving, then the clamp may be closed to establish the conductive contact.

Note that while the clamp 150 has been described as a manually operated device, in one or more embodiments herein the clamp 150 may be automatic (i.e., without user intervention) in response to the air terminal adjusting its length. For instance, similar to the motorized spooling and unspooling of the cable as described above, the opening and closing of the clamp 150 may be based on user input to adjust the length of the air terminal 110. For example, opening may be in response to a user input to adjust the length of the air terminal (e.g., extending or retracting), and closing may be in response to a user input to cease adjustment of the air terminal length. In other words, an operator in this embodiment need only lengthen or shorten the air terminal, and the clamp opens and closes as necessary to allow movement of cable 130 and to establish the connection.

Figure 6:
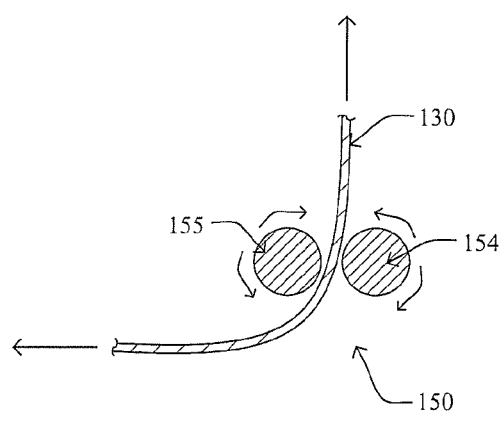
FIG. 6 illustrates an example conductive clamp using rollers.

In another alternative arrangement, clamp 150 may comprise strictly a roller system. For example, as shown in FIG. 6, the first down-conductor cable 130 may be compressed between two rollers 154 and 155, which may both be fixed to the structure 102, or else one or both may be spring loaded to maintain electrical connectivity with the cable 130. In this embodiment, the clamp 150 (conductive roller assembly 154/155) need not open and close, but may remain in consistent contact with the down-conductor 130 throughout its range of motion. Note that in this embodiment, roller 151 (of FIG. 2) may not be necessary. Also note that in this embodiment, one of the rollers 154/155 may be replaced with a stationary plate 152/153, such that one roller maintains pressure on the cable 130, which slides in electrically conductive relationship to an opposing plate.

Figure 7:
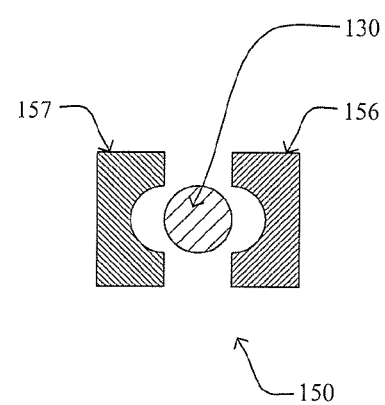
FIG. 7 illustrates an example curved clamp.

Generally, the clamp 150, in particular, plates 152/153 and/or rollers 154/155, is shaped to substantially conform to the shape of the first down-conductor cable 130 to establish an adequately conductive high-current-capable electrical contact with the first down-conductor cable. For example, when a flattened tubular braided cable is used (e.g., shown in FIG. 3A), the plates and rollers of the clamp 150 may be generally flat. However, as shown in FIG. 7, if the first down-conductor cable 130 has a curve to its shape, such as a solid copper wire, non-flattened copper braided wire, etc., then the clamp 150 may comprise curved plates/rollers 156/157 to substantially conform to the curved exterior of the first down-conductor cable to ensure a proper electrical connection.

According to one or more embodiments herein, referring again to FIG. 2, the clamp 150 may be attached to the structure 102 between the cable reel 120 and the payload 104, and makes contact with the first down-conductor (e.g., a conductive braid) 130. The clamp 150, in particular, is used to provide a high-current-capability ground to the stationary (non-adjustable/telescoping) portion of the payload (e.g., the mobile tower/truck trailer) 102. That is, the clamp mechanism 150 is designed to handle lightning strike currents (e.g., in excess of 70,000 Amps), and is bonded to the structure 102. A second down-conductor cable 132 is conductively attached to the clamp 150 (at a first end of the cable 132), and is adapted to conductively attach to an electrical ground plane 140 (at another end of the cable 132). For example, a grounding rod 134 or other device/means (plates, grates, burial of the end of the cable, etc.) may be used to insert or otherwise conductively attached the second down-conductor cable 132 to the electrical ground plane (e.g., earth ground) 140.

Once the second down-conductor cable 132 is attached to the electrical ground plane 140, a high-current-capable grounding path 114 from the first end of the first down-conductor cable (the air terminal end) passes through the clamp 150 to the second end of the second down-conductor cable (the grounded end). Notably, this path 114 is a low-impedance path, particularly when compared to the high-impedance path found through the spooled primary/first down-conductor cable.

Figure 8A:
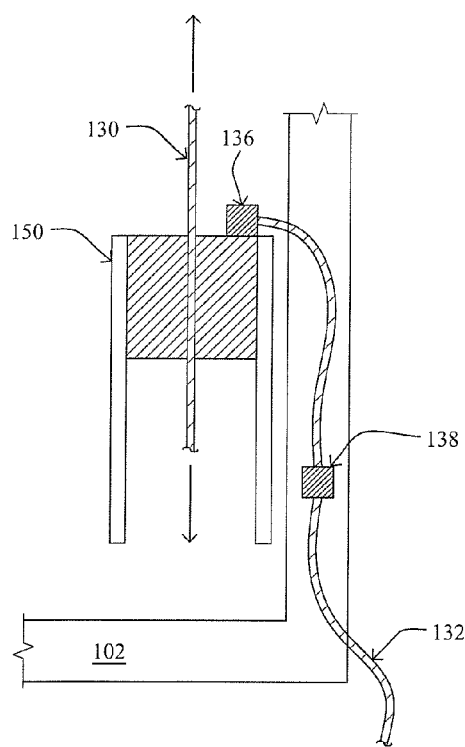
FIGS. 8A-B illustrate example chassis grounds.
Figure 8B:
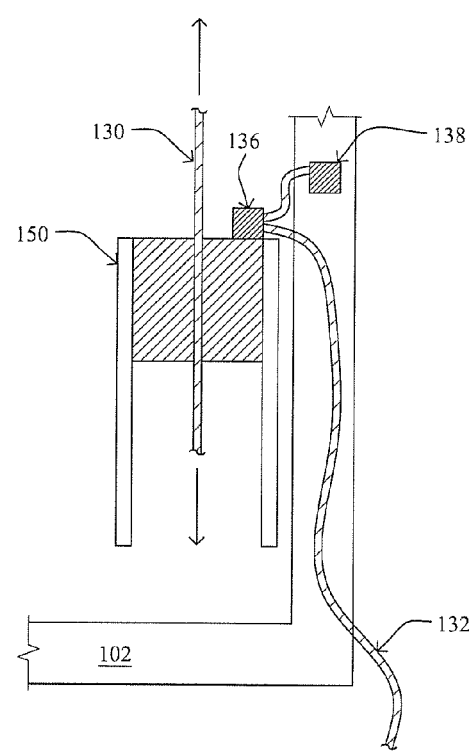

As shown in detail in FIG. 8A, the clamp 150 and second down-conductor 132 may be conductively attached by connection 136, such as a weld, solder, bracket, bolt, screw, etc. Also, a second conductive attachment 138 may be located along the second down-conductor 132 to establish an additional grounding connection with the structure 102, e.g., a vehicle chassis to which other devices on the vehicle (structure) are attached. Alternatively, as shown in FIG. 8B, a separate (e.g., "third") down-conductor cable 139 may create the conductive attachment between the second down-conductor cable 132 and the vehicular chassis ground at connection 138 (e.g., from shared connection 136 at the clamp 150, or else other connection along the second down-conductor 132). As still another alternative, the clamp 150 itself may be electrically bonded to the structure 102.

In particular, additional precautions may be taken to prevent side-flashes between conductive objects on or in the structure and the lightning grounding system. That is, the surge of lightning current through a lightning protection conductor can create a voltage difference between it and any conductive objects that are near it that is large enough to cause a dangerous side-flash (spark) between the two that can cause significant damage, especially on structures housing flammable or explosive materials. By ensuring the electrical continuity between the lighting strike down-conductor system 200 and any objects susceptible to a side-flash (e.g., chassis/structure 102), the voltage potential of the two objects rise and fall in tandem, thereby reducing risk of a side-flash.

Figure 9:
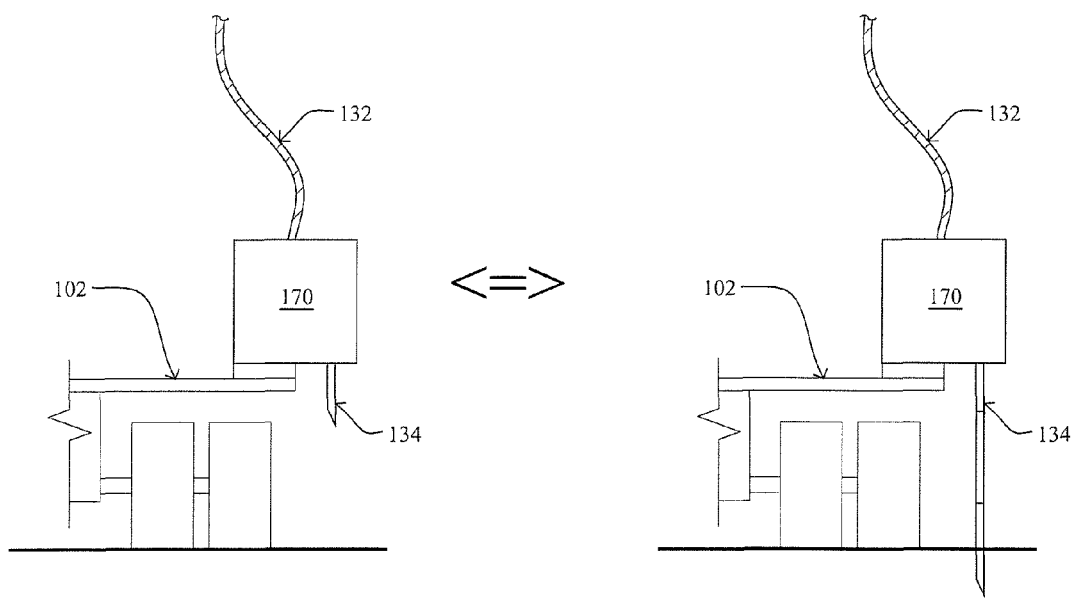
FIG. 9 illustrates an example of a cable with integrated ferrules.

According to one or more specific embodiments, a plurality of ferrules may be spaced along the first down-conductor cable 130, e.g., to provide additional durability to the cable 130. For instance as shown in FIG. 9, ferrules 190, such as compressed (e.g., solid) copper, may be placed at various locations (e.g., periodically) along the first down-conductor cable 130. Note that in certain embodiments, the clamp 150 may be configured to establish the high-current-capable electrical contact with the first down-conductor cable via at least one of the plurality of ferrules 190, such as clamping onto a ferrule instead of the cable 130 itself.

Figure 10:
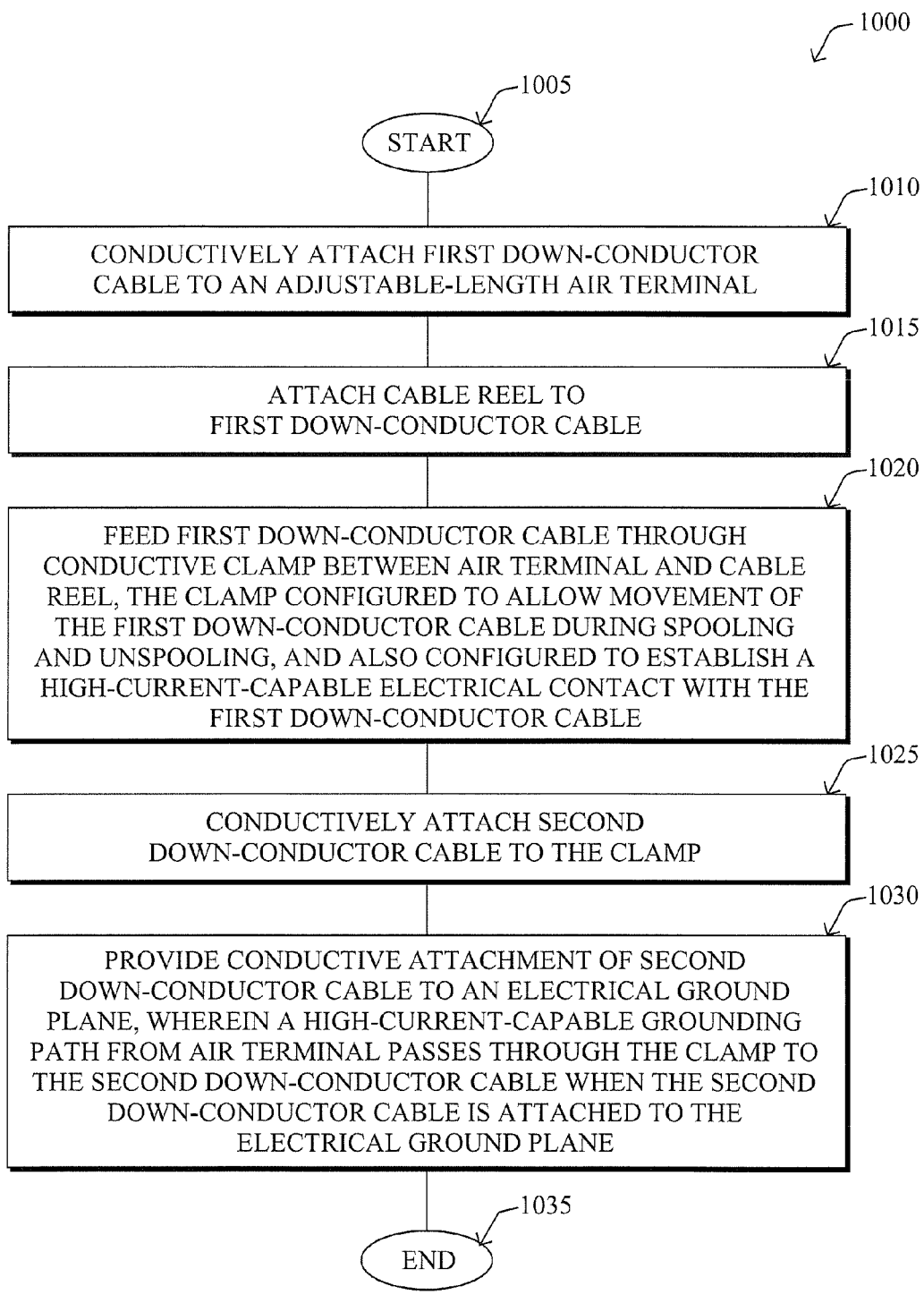
FIG. 10 illustrates an example simplified procedure for providing a variable-length lightning strike down-conductor.

FIG. 10 illustrates an example simplified procedure for providing a variable-length lightning strike down-conductor 200 as described above. The procedure 1000 starts at step 1005, and continues to step 1010, where a first (e.g., primary) down-conductor cable 130 is conductively attached to an adjustable-length air terminal 110, and to step 1015 where the down-conductor cable 130 is also attached at another end to a cable reel 120. Note that between the cable reel 120 and the air terminal 110, the first down-conductor cable 130 is fed, in step 1020, through a conductive clamp 150 as described above. In particular, as detailed above, the clamp is configured to allow movement of the first down-conductor cable during spooling and unspooling (e.g., when open), and also configured to establish a high-current-capable electrical contact with the first down-conductor cable (e.g., when closed).

In step 1025, a second down-conductor cable 132 is conductively attached to the clamp 150, thus creating a conductive path (a portion of path 114) from the first down-conductor cable 130 to the second down-conductor cable 132 via the clamp 150. In step 1030, a conductive attachment is provided for the second down-conductor cable 132 to attach to an electrical ground plane 140, such as providing a grounding rod 134 or connection to a grounding rod, as mentioned above. (Note that the procedure 1000 is illustratively directed toward providing the variable-length down-conductor, and that the actual attachment of grounding rod 134 to the ground plane 140 is not necessary for the procedure 1000.)

When the second down-conductor is actually attached to the electrical ground plane, then a high-current-capable grounding path 114 is established from the air terminal 110 that passes down the first down-conductor cable 130 through the clamp 150 to the second down-conductor cable 132 as a low-impedance path, e.g., redirecting any current away from the cable reel 120 and any coiled (spooled) portion of the first down-conductor cable (a relatively high-impedance path), accordingly. Also, the second down-conductor cable may be conductively attached to a vehicle chassis 102, such as via connection 138, third down-conductor cable 139, etc., as noted above. The procedure 1000 ends in step 1035, where an operator may utilize the provided variable-length lightning strike down-conductor 200, accordingly. Note that the order of the steps shown in procedure 1000 of FIG. 10 are merely illustrative, and any logical order of the steps may be used to provide a variable-length lightning strike down-conductor 200 in accordance with the embodiments herein. As such, the order described above is merely a representative example, and is not meant to limit the scope of the embodiments herein.

Figure 11:
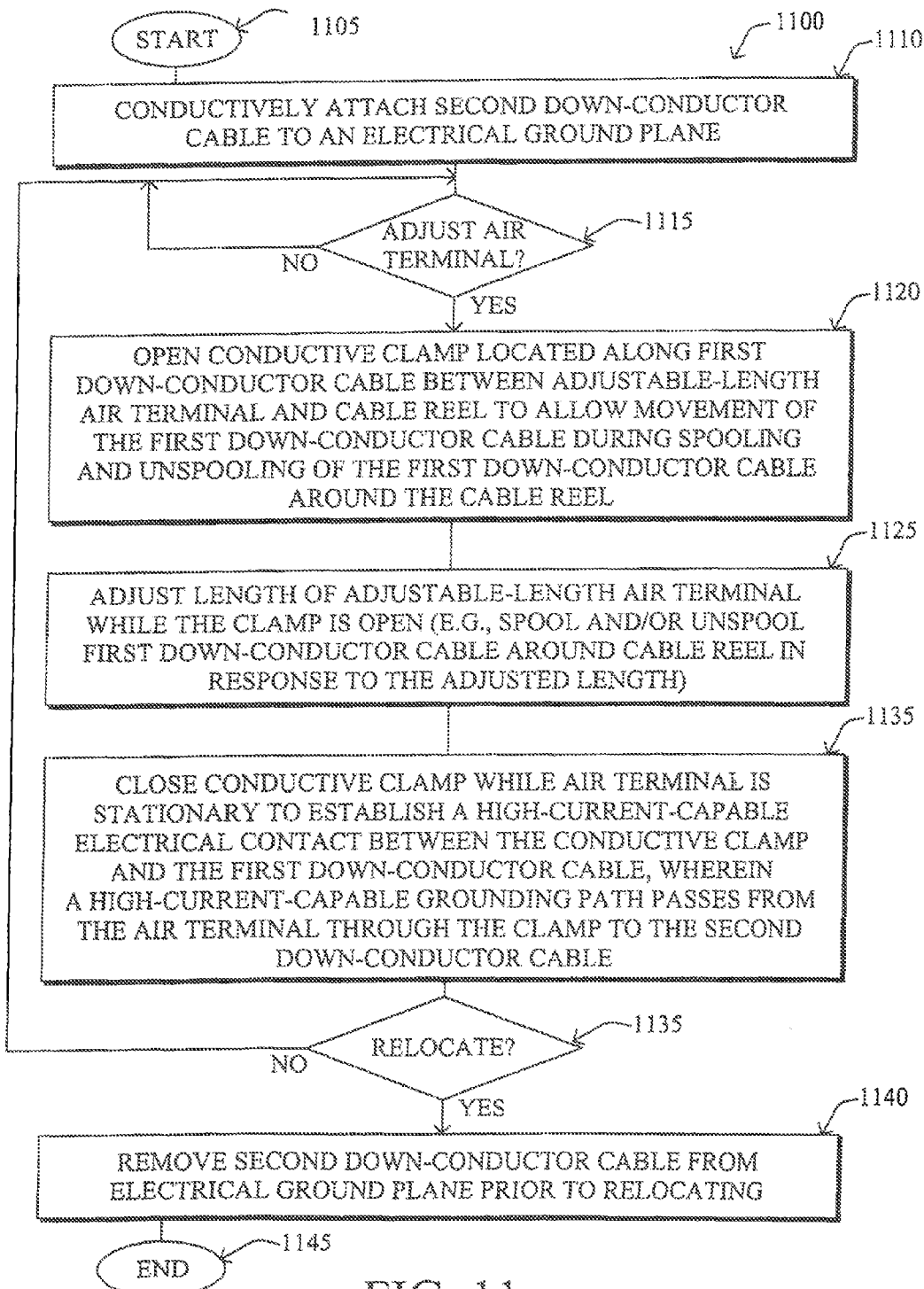
FIG. 11 illustrates an example simplified procedure for operating a variable-length lightning strike down-conductor.

FIG. 11 illustrates an example simplified procedure for operating a variable-length lightning strike down-conductor. The procedure 1100 starts at step 1105, and continues to step 1110, where an operator, who has been provided with a variable-length lightning strike down-conductor 200 (e.g., as described above with reference to FIG. 10), may place system (equipment, such as truck 102, antenna 104, etc.) in a desired location, and conductively attach the second down-conductor cable 132 to an electrical ground plane 140. For example, as described herein, the operator may insert a grounding rod 134 into the earth ground at the desired location of the air terminal, or else other measures may be taken to ensure proper grounding of the second down-conductor cable 132 (e.g., watercraft considerations, etc.).

When the operator wants to adjust the air terminal in step 1115, then in step 1120 the operator may, where necessary, open the conductive clamp 150 located along the first down-conductor cable 130 between the adjustable-length air terminal 110 and cable reel 120 to allow movement of the first down-conductor cable 130 during spooling and unspooling of the first down-conductor cable around the cable reel 120, as described above. With the first down-conductor cable 130 free to move within the clamp 150, e.g., while the clamp is open, the operator may then adjust the length of the adjustable-length air terminal 110 in step 1125, thus spooling and/or unspooling the first down-conductor cable 130 around cable reel 120 in response to the adjusted length. Once the desired length (e.g., height) is reached in step 1125, the conductive clamp 150 is closed in step 1130 while the air terminal 110 is stationary to establish a high-current-capable electrical contact between the conductive clamp and the first down-conductor cable 130. Note that in certain embodiments, as mentioned above, the opening and closing of the conductive clamp may be an automatic response to operator input the adjust the length of the air terminal, i.e., the operator opens and closes the clamp by inputting a command to adjust the length (open) and stop adjusting the length (close), accordingly.

With the clamp 150 establishing a conductive attachment to the first down-conductor cable 130, a high-current-capable grounding path 114 passes from the air terminal 110 (down down-conductor cable 130) through the clamp 150 to the second down-conductor cable 132, ultimately to electrical (e.g., earth) ground plane 140. As such, in the event of a lightning strike, the air terminal may pass the high current event through the high-current-capable low-impedance grounding path 114, as opposed to the cable reel 120 and associated coiled/spooled first down-conductor cable 130 (a high-impedance path), protecting the equipment/structure (e.g., antenna 104, truck 102, etc.) from the event.

If there is no desire to relocate the equipment, or simply no ability to do so (e.g., stationary adjustable-length masts) in step 1135, then the procedure 1100 continues to step 1115 to allow the operator to adjust the length of the adjustable-length air terminal 110. If, on the other hand, in step 1135 the system is to be relocated (e.g., road-march) from a first geographic location to another geographic location, then in step 1140, after illustratively reducing the length of the air terminal 110 (and spooling the first down-conductor 130 around the cable reel 120), the operator may remove the second down-conductor cable 132 from the electrical ground plane 140 prior to relocating the air terminal to the other geographic location (e.g., driving the truck 102). The procedure in this instance ends in step 1145, where once relocated, may begin again at step 1105 to reestablish the connection with the ground plane 140 prior to adjusting the length of the air terminal 110, accordingly.

Advantageously, the novel techniques described herein provide for a variable-length lightning strike down-conductor. In particular, the system described herein allows for optimized ground path length, where excess down-conductor (grounding) cable is tightly coiled (e.g., as a mono-spiral coil) on a cable reel. Specifically, by clamping the first/primary down-conductor at any intermediate length, and shunting the clamp to the ground plane (e.g., earth ground) through a different down-conductor cable (avoiding the coiled primary down-conductor cable), the techniques herein alleviate excess twists, loops, or tight bends from the down-conductor's path that would generally otherwise reduce down-conductor effectiveness (e.g., due to the impedance seen by the lightning strike to reach the ground plane). For instance, through the arrangement described above, it is possible to achieve 90% redirection of a lightning strike through the clamp to the ground plane, as opposed to through the coiled cable, and particularly, through the protected equipment. In addition, the techniques herein require minimal operator participation, e.g., such that the operator is not required to disconnect and re-make ground connections to raise or lower a tower, and allow for rapid emplacement and tear-down (e.g., road-march) of equipment in general.

While there have been shown and described illustrative embodiments that provide for a variable-length lightning strike down-conductor, it is to be understood that various other adaptations and modifications may be made within the spirit and scope of the embodiments herein. For example, the embodiments have been shown and described herein with relation to lightning strikes. However, the embodiments in their broader sense are not so limited, and may, in fact, be used for protection against other similar types of high-current events. The low-impedance path from the payload to ground may also used to help dissipate currents induced from an electro-magnetic pulse (EMP.)

Also, while the lightning protection system is shown generally for land-based deployment (trucks, towers, buildings, etc.), watercraft (e.g., boats) may also utilize the system in accordance with embodiments herein. For instance, an adjustable-length air terminal may be mounted on the top of a mast or superstructure, and the electrical ground plane 140 may be embodied as the water. For a vessel with a conducting (iron or steel) hull, the grounding "rod" (grounding conductor) 134 to which the second down-conductor 132 attaches may simply be the vessel hull. For a vessel with a non-conducting hull, the grounding conductor may be retractable, part of the hull, or attached to a centerboard.

The foregoing description has been directed to specific embodiments. It will be apparent, however, that other variations and modifications may be made to the described embodiments, with the attainment of some or all of their advantages. For instance, it is expressly contemplated that certain components and/or elements described herein, such as control of the clamp, adjustable-height air terminal, motorized spooling and/or unspooling, etc., can be implemented as software being stored on a tangible (non-transitory) computer-readable medium (e.g., disks/CDs/etc.) having program instructions executing on a computer, hardware, firmware, or a combination thereof Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. An apparatus, comprising:
a first down-conductor cable having a first and second end and adapted to conductively attach to an adjustable-length air terminal approximate to the first end of the first down-conductor cable;
a cable reel attached to the first down-conductor cable approximate to the second end of the first down-conductor cable, the cable reel configured to spool and unspool the first down-conductor cable in response to movement of the adjustable-length air terminal;
a conductive clamp positioned along the first down-conductor cable between the first end of the first down-conductor and the cable reel, the clamp configured to allow movement of the first down-conductor cable during spooling and unspooling, and also configured to establish a high-current-capable electrical contact with the first down-conductor cable; and
a second down-conductor cable conductively attached to the clamp approximate to a first end of the second down-conductor cable, the second down-conductor cable adapted to conductively attach to an electrical ground plane approximate to a second end of the second down conductor, wherein a high-current-capable grounding path from the first end of the first down-conductor cable passes through the clamp to the second end of the second down-conductor cable as a low-impedance path when the second end of the second down-conductor cable is attached to the electrical ground plane.

2. The apparatus as in claim 1, wherein the cable reel comprises a mono-spiral configuration.

3. The apparatus as in claim 1, further comprising:
a spring attached to the cable reel, the spring configured to spring-load the cable reel during spooling and unspooling.

4. The apparatus as in claim 1, wherein at least one of the first down-conductor cable and second down-conductor cable comprises one of either a braided cable or a twisted multi-strand cable.

5. The apparatus as in claim 1, wherein at least one of the first down-conductor cable and second down-conductor cable comprises a flattened tubular cable.

6. The apparatus as in claim 1, further comprising:
a motor attached to the cable reel, the motor configured to spool the cable reel in response to an input to the air terminal to shorten its length and to unspool the cable reel in response to an input to the air terminal to extend its length.

7. The apparatus as in claim 1, wherein the clamp is configured to open to allow movement of the first down-conductor cable during spooling and unspooling, the clamp further configured to close to establish the high-current-capable electrical contact with the first down-conductor cable.

8. The apparatus as in claim 1, wherein the first down-conductor cable has a generally curved exterior, and wherein an interior of the clamp is curved to substantially conform to the curved exterior of the first down-conductor cable.

9. The apparatus as in claim 1, wherein the clamp comprises a conductive roller assembly.

10. The apparatus as in claim 1, wherein a high-impedance grounding path from the first end of the first down-conductor cable passes through the second end of the first down-conductor, and wherein a majority of any current received at the first end of the first down-conductor cable passes through the low-impedance path to the second end of the second down-conductor cable attached to the electrical ground plane.

11. The apparatus as in claim 1, further comprising:
a plurality of ferrules spaced along the first down-conductor cable.

12. A method, comprising:
conductively attaching a first down-conductor cable to an adjustable-length air terminal approximate to a first end of the first down-conductor cable;
attaching a cable reel to the first down-conductor cable approximate to a second end of the first down-conductor cable, the cable reel configured to spool and unspool the first down-conductor cable in response to movement of the adjustable-length air terminal;
feeding the first down-conductor cable through a conductive clamp between the first end of the first down-conductor and the cable reel, the clamp configured to allow movement of the first down-conductor cable during spooling and unspooling, and also configured to establish a high-current-capable electrical contact with the first down-conductor cable;
conductively attaching a second down-conductor cable to the clamp approximate to a first end of the second down-conductor cable; and providing a conductive attachment for the second down-conductor cable to an electrical ground plane approximate to a second end of the second down conductor, wherein a high-current-capable grounding path from the first end of the first down-conductor cable passes through the clamp to the second end of the second down-conductor cable as a low-impedance path when the second end of the second down-conductor cable is attached to the electrical ground plane.

13. The method as in claim 12, further comprising:
spooling the first down-conductor around the cable reel in a mono-spiral configuration.

14. The method as in claim 12, further comprising:
spring-loading the cable reel.

15. The method as in claim 12, further comprising:
conductively attaching the first end of the second down-conductor cable to a vehicular chassis ground.

16. The method as in claim 12, further comprising:
opening the clamp to allow movement of the first down-conductor cable during spooling and unspooling; and
closing the clamp to establish the high-current-capable electrical contact with the first down-conductor cable.

17. The method as in claim 16, further comprising:
configuring the clamp to open and close without user intervention based on the air terminal adjusting its length.

18. A method, comprising:
conductively attaching a second down-conductor cable to an electrical ground plane approximate to a second end of the second down conductor, the second down-conductor cable conductively attached to a conductive clamp approximate to a first end of the second down-conductor cable;
opening the conductive clamp, the conductive clamp located along a first down-conductor cable between a first end of the first down-conductor at an adjustable-length air terminal and a second end of the first down-conductor at a cable reel, the opening to allow movement of the first down-conductor cable during spooling and unspooling of the first down-conductor cable around the cable reel;
adjusting the length of the adjustable-length air terminal while the clamp is open, wherein the cable reel is configured to spool and unspool the first down-conductor cable in response to the adjusted length; and
closing the conductive clamp while the length of the adjustable-length air terminal is stationary, the closing to establish a high-current-capable electrical contact between the conductive clamp and the first down-conductor cable, wherein a high-current-capable grounding path from the first end of the first down-conductor cable passes through the clamp to the second end of the second down-conductor cable as a low-impedance path when the second end of the second down-conductor cable is attached to the electrical ground plane.

19. The method as in claim 18, wherein the electrical ground plane comprises earth ground.

20. The method as in claim 18, wherein opening is in response to a first user input to adjust the length of the air terminal, and wherein closing is in response to a second user input to cease adjustment of the air terminal length.

21. The method as in claim 18, wherein the air terminal is located at a first geographic location, the method further comprising:
reducing the length of the air terminal;
spooling the first down-conductor around the cable reel; and
relocating the air terminal to a second geographic location.

* * * * *

UNITED STATES PATENT AND TRADEMARK OFFICE
CERTIFICATE OF CORRECTION

| | | |
|---|---|---|
| PATENT NO. | : 8,481,851 B2 | Page 1 of 1 |
| APPLICATION NO. | : 13/033963 | |
| DATED | : July 9, 2013 | |
| INVENTOR(S) | : John P. Higby | |

It is certified that error appears in the above-identified patent and that said Letters Patent is hereby corrected as shown below:

In the Specifications:

Column 1, line 8, the statement "may have" should be changed to -- has --.

Signed and Sealed this
Tenth Day of September, 2013

Teresa Stanek Rea
*Acting Director of the United States Patent and Trademark Office*